July 19, 1966     E. A. WAHL     3,261,508
VIBRATORY BIN ACTIVATOR
Filed Jan. 24, 1964     3 Sheets-Sheet 1
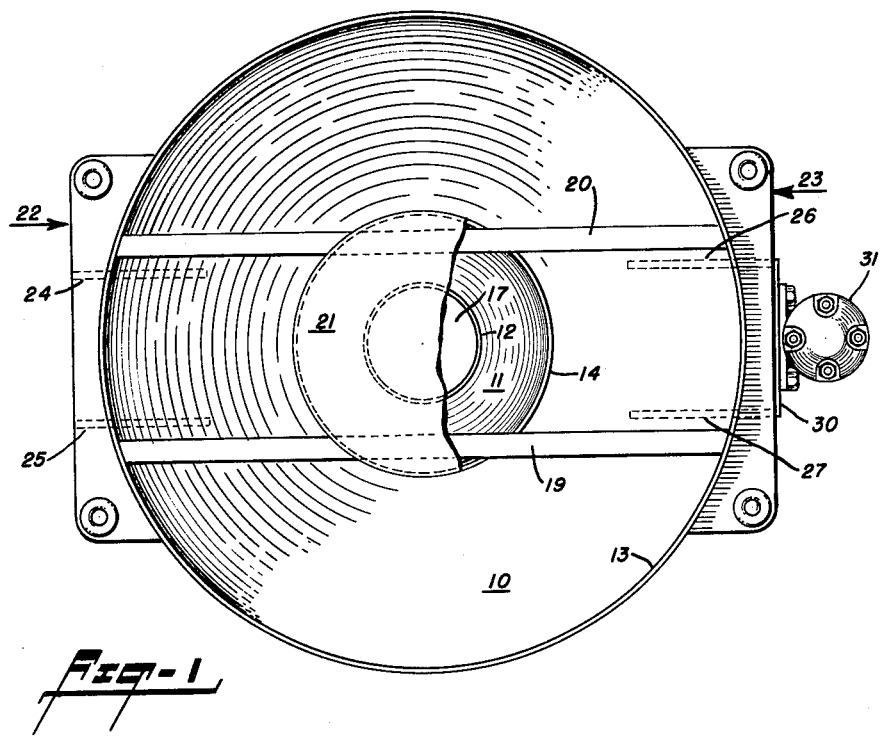
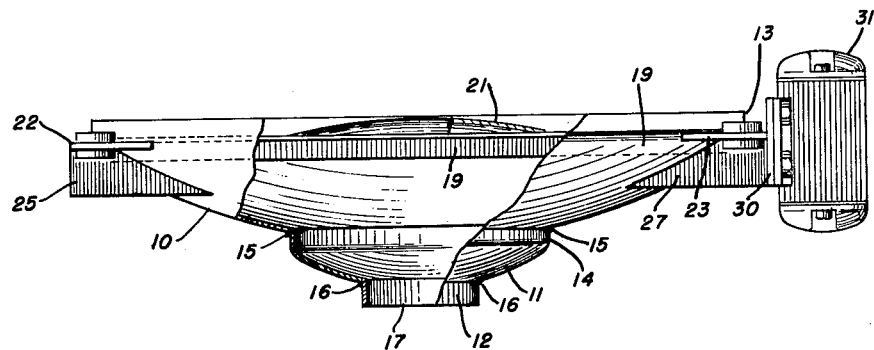
EUGENE A. WAHL
INVENTOR.

July 19, 1966 E. A. WAHL 3,261,508
VIBRATORY BIN ACTIVATOR
Filed Jan. 24, 1964 3 Sheets-Sheet 2

EUGENE A. WAHL
INVENTOR.

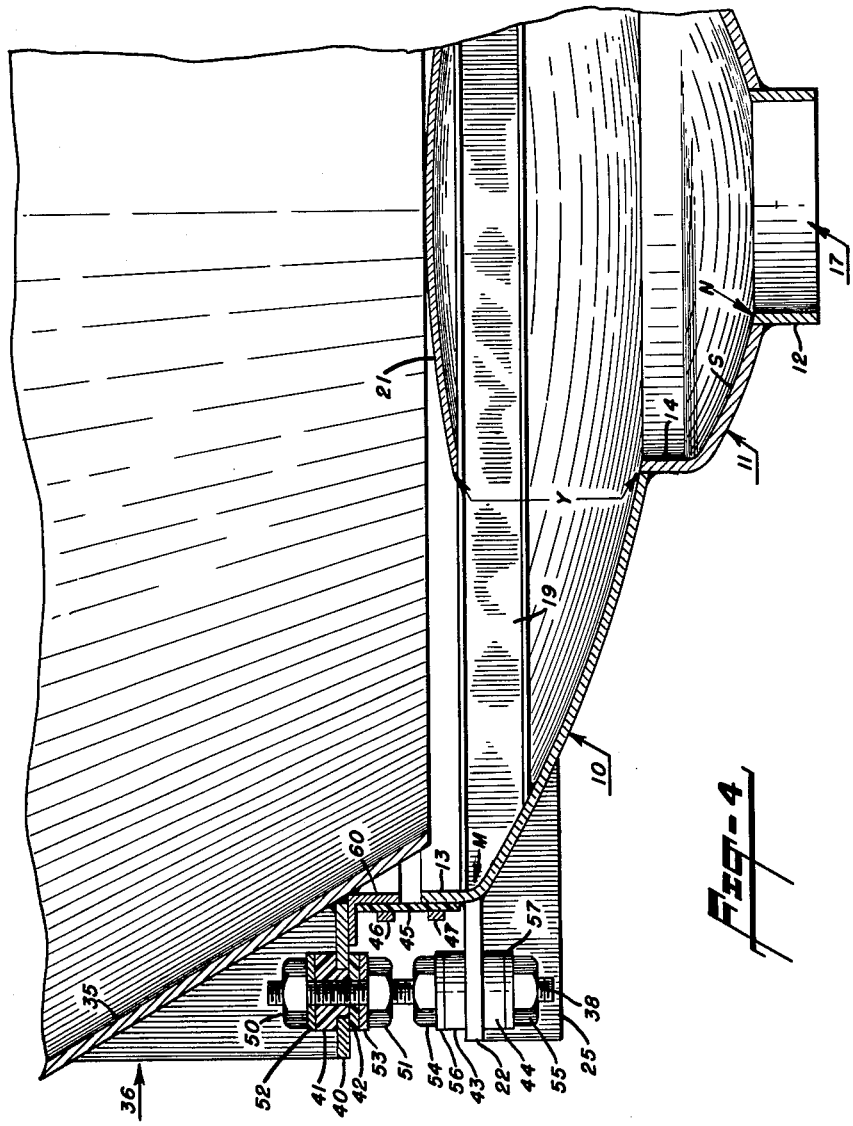

United States Patent Office 3,261,508
Patented July 19, 1966

3,261,508
VIBRATORY BIN ACTIVATOR
Eugene A. Wahl, 294 Forest Ave., Glen Ridge, N.J.
Filed Jan. 24, 1964, Ser. No. 340,018
17 Claims. (Cl. 222—199)

This invention relates to bin activator apparatus and more particularly to apparatus adapted for attachment to a storage bin, or hopper, to promote a positive flow of material therefrom.

The hoppering problem, that is, the problem of providing a positive, continuous flow of most solids from storage bins, has been, for many years, a vexing and costly bottleneck in continuous or automated processing applications. Wherever solids must be moved from storage into a process, the first step in the process, namely, the continuous discharge of the material from the storage bin, heretofore has defied the most varied and expensive methods for bringing this about. The problem is complex because it involves many variable factors, such as the size, shape and character of the particular material, temperature, humidity, etc. Fibrous, sticky, and the like, materials have a tendency to bridge across even very large horizontal distances. A further problem is the stagnation of the material around the bin walls with the material toward the center of the bin moving out preferentially and resulting in what is commonly called "rat-holing."

It has been estimated that industry loses many millions of dollars each year because of process interruptions due to faulty flow of the material out of the storage bin. Additionally, many millions of dollars have been spent in seeking a solution to the problem.

The design of storage bins, per se, has been the subject of extensive and thorough research, both mathematical and empirical. However, experts in this field have found that in spite of the best bin designs, a dependable outflow of the material cannot be obtained without the use of auxiliary devices operatively associated with the bin.

Many auxiliary devices and arrangements have been proposed to promote the flow of material from a storage bin, including vibrators mounted to the exterior surface of the bin, multiple screw conveyors arranged across the bottom of the bin, sweep arms operating as giant agitators within the bin, pulsating pads disposed along the inner wall of the bin, etc. While heretofore known devices and arrangements are each satisfactory for use under limited conditions and with certain materials, none has proven to be satisfactory for use with really difficult-to-handle materials, such as, for example, wet sand, clay, wood chips, etc.

The present invention overcomes the shortcomings of the prior devices, of this class. The apparatus is adapted for vibratory attachment to the bottom of a storage bin. Such apparatus is subjected to vigorous vibration and includes means for vigorously agitating the material at the critical point, namely, in the region of the discharge opening of the bin.

An object of this invention is the provision of apparatus adapted for use with a storage bin, or hopper, which apparatus is constructed and arranged to provide a positive discharge of the material from the bin.

An object of this invention is the provision of apparatus for attachment to a storage bin, which apparatus includes means for vigorously agitating the material in the region of the bin discharge opening, and means for controlling the converging flow of the material from the hopper and through an outlet opening provided in the apparatus.

An object of this invention is the provision of apparatus for promoting flow of material from a storage bin, which apparatus is constructed and arranged for effecting a positive discharge of the material, through an outlet opening, at a relatively uniform rate during the time that the apparatus is vibrated, and for arresting such discharge of the material when the apparatus is not vibrated.

An object of this invention is the provision of apparatus for attachment to the bottom of a storage bin having a discharge opening at the bottom, which apparatus comprises material-receiving means having concave side walls terminating in an outlet opening, means forming an annular opening defining a flow path for the material from the bin into the material-receiving means, means for imparting vibrations to the apparatus and means for attaching the apparatus in operative position to the bin.

An object of this invention is the provision of bin activator apparatus vibrationally attached to a storage bin, which apparatus comprises a bottom wall formed of a plurality of concentrically-arranged, concave members leading to an output opening, baffle means spaced from the outlet opening, and a gyrator for imparting vigorous vibrations to the apparatus.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a top plan view of apparatus made in accordance with this invention, with a portion of the baffle member broken away;

FIGURE 2 is a side, elevational view thereof, with a portion of the side walls of the concave members broken away;

FIGURE 4 is an enlarged, fragmentary, view showing the apparatus attached to the storage bin, with certain parts shown in cross-section.

Figure 3:
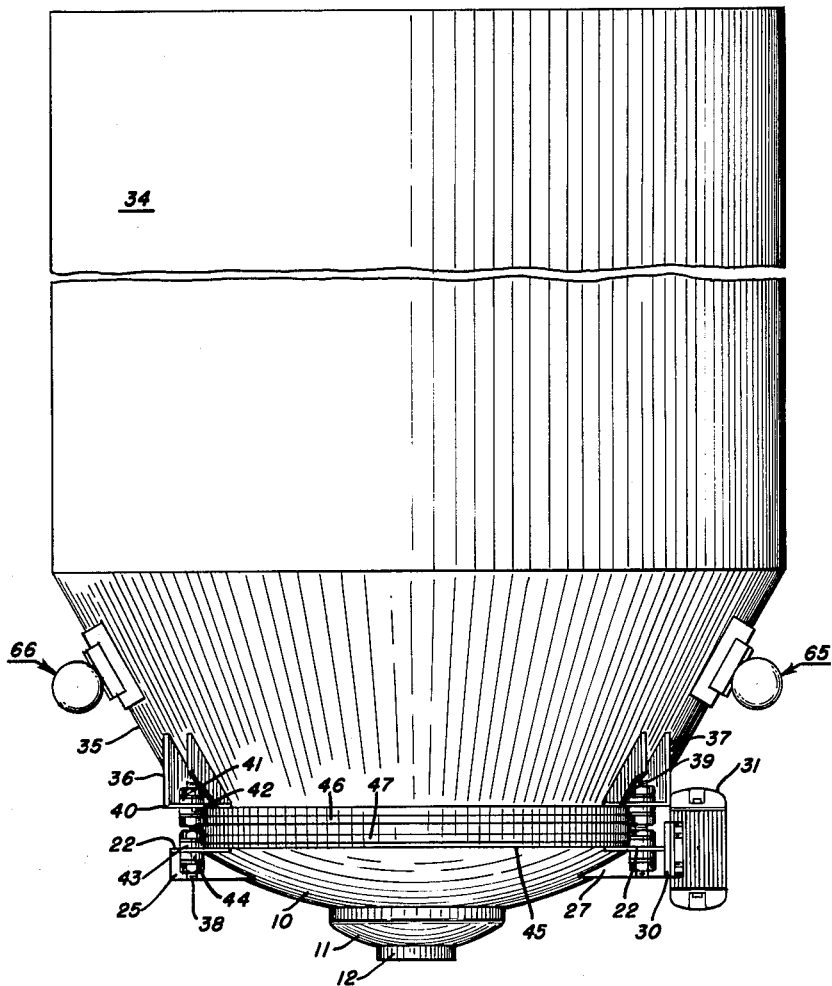
FIGURE 3 is a side elevational view showing the apparatus attached to a storage bin, and drawn to a reduced scale.

Reference, now, is made to FIGURES 1 and 2 showing bin activator apparatus made in accordance with this invention. Such apparatus comprises the two metal, dish-shaped members 10 and 11 and a tubular member 12, said members being concentrically arranged and welded together to form a rigid, unitary structure. The base ends of the dish-shaped members 10 and 11 include cylindrical sections of relatively short axial lengths, such sections being identified by the numerals 13 and 14, respectively. It may here be pointed out that the dish-shaped members are obtainable as stock items, in various sizes and contours, thereby affording manufacturing economy, in addition to other advantageous features, as will be described hereinbelow.

In the manufacture of the bin activator apparatus, the bottom of the dish-shaped member 10 is cut out along a desired plane to provide a central opening accommodating the cylindrical portion of the associated dish-shaped member 11 and the two members are welded together along the common circle, as indicated by the weld 15. Similarly, a central hole is cut in the dish-shaped member 11 to accommodate the tubular member 12, these members also being welded together as indicated by the numeral 16. Thus, the members 10, 11 and 12 form an integral assembly with the opening 17 constituting the outlet opening for the discharge of such material as may be contained within the members 10 and 11. The concave, contour of these members results in structural elements of great strength, whereby the members can have relatively thin wall thicknesses resulting in economy of material as well as a reduction in the overall weight of the apparatus. For example, a wall thickness of $5/16''$ is sufficient for members having a base diameter up to 10 feet, regardless of the particular material to be hoppered.

A pair of angle-iron bars 19 and 20 extend across the interior of the dish-shaped member 10 and have ends welded to the cylindrical base portion thereof. These bars support a third dish-shaped member 21 which is welded thereto. The member 21 is inverted and has a peripheral surface spaced from the inner wall of the dish-shaped member 10 to provide an annular path for the flow of material from the hopper to the members 10 and 11, as will be described in more detail hereinbelow.

Opposed horizontally-disposed mounting plates 22 and 23 have inner sides welded to the dish-shaped member 10, such sides having arcuate shapes conforming to that of the member 10. The mounting plates are provided with corner holes for receiving tie rods by means of which the apparatus is vibrationally suspended from a storage bin. Spaced pairs of gussets 24, 25 and 26, 27 are welded to the under surfaces of the respective mounting plates 22 and 23 as well as to the outer wall of the dish-shaped member 10. The aligned end surfaces of the mounting plate 23 and the underlying gussets 26 and 27 are welded to a vertical plate 30 provided with tapped holes for receiving the mounting bolts of a gyrator 31. Such gyrator preferably is a self-contained, fully-enclosed unit comprising an electric motor having a vertical shaft carrying one or more eccentrically-mounted weights. Upon energization of the motor, the weights rotate in a horizontal plane, thereby imparting vigorous vibrations to the apparatus. In the illustrated mounting of the gyrator, the vibrations imparted to the apparatus are predominantly in a direction normal to the vertical axis of the apparatus. Such vibration of the apparatus effectively fluidizes the contained material thereby promoting a positive discharge thereof through the outlet opening 17. The speed of rotation of the eccentrically-mounted weights (of the gyrator) and the amplitude of the vibrations imparted to the apparatus will vary with the size of the particular apparatus and the material to be hoppered. In general, a relatively high rotation frequency may be combined with a relatively lower vibration amplitude. I have found that a vibration frequency of 1800–3000 cycles per minute and an amplitude of 0.020–0.125 inch provides an operating range suitable for use with very large storage bins containing materials which are considered difficult to handle. For example, a gyrator frequency of 1800 r.p.m., in the case of a motor and weights capable of producing a thrust of ⅛ inch, will effectively fluidize contained materials such as wet sand, clay, wood chips, etc.

Reference, now, is made to FIGURE 3, which shows the bin activator apparatus attached to a storage bin 34 having a concial bottom section 35. Welded to the bin wall are four sets of brackets, only the front sets 36 and 37 being visible in the view of FIGURE 3. Each set of the brackets includes a horizontal plate provided with a hole for receiving the associated tie rods 38 and 39 having threaded ends. Referring, specifically, to the rod 38, the upper end thereof passes through the hole formed in the horizontal plate 40 and through the vibration isolators 41 and 42, whereas the lower end passes through the hole formed in the mounting plate 22 and through the vibration isolators 43 and 44. A desired spacing between the lower end of the bin and the bin activator apparatus is obtained by means of suitable nuts applied to the rods, as will be explained hereinbelow with reference to FIGURE 4. Suffice to say, for the present, that the annular space between the upper cylindrical portion of the dish-shaped member 10 and the wall defining the discharge opening of the hopper is closed by a resilient band 45 secured in place by two circular straps 46, 47. By suspending the bin activator apparatus from the bin, by means of the four tie rods and the associated vibration isolators, the apparatus is relatively free to vibrate in response to the vibratory thrust forces applied thereto by the eccentrically-mounted weights of the gyrator 31.

The details of the mounting arrangement for vibrationally supporting the bin activator apparatus in operative position on the storage bin is best shown in the enlarged fragmentary view of FIGURE 4. This view shows one of the triangular, vertical plates of the bracket set identified by the numeral 36 and the horizontal plate 40. The upper vibration isolator 41 includes a shank portion passing through the hole formed in the plate 40 and abutting against the lower vibration isolator 42. The upper end of the tie rod 38 is secured in position by means of the nuts 50 and 51 seated against the flat washers 52 and 53, respectively. The lower end of the tie rod is secured in position by means of the bolts 54 and 55 and the washers 56 and 57, respectively positioned on opposite sides of the mounting plate 22 and seated against the vibration isolators 43, 44. The vibration isolators, or mounts, 41–44 preferably are made of rubber. It will be apparent that four tie rods and associated vibration mounts (all similar to the tie rod and mounts just described) vibrationally support the bin activator apparatus in operative position relative to the bin.

A ring 60, having an L-shaped cross-section, encircles the conical wall 35 of the bin, and is welded thereto as well as to the horizontal plate 40. The vertical wall of the ring 60 is aligned with and spaced from the end of the cylindrical section 13 of the dish-shaped member 10, and the space therebetween is closed by the band 45 made of rubber, or other suitable flexible material. This band is secured in position by the two metal straps 46 and 47, each strap being provided with conventional means, such as a turn-buckle, by means of which the band 45 may be drawn up tightly around the ring 60 and the section 13.

It will now be clear that the inverted dish-shaped member 21 constitutes a baffle supporting the load of the material contained within the hopper, and that the annular space, having a vertical height (Y), constitutes the path for the flow of the material from the dish-shaped member 10 into the dish-shaped member 11. Unless the bin activator apparatus is vibrated, material may pass through the gap (Y) or may bridge across this gap. If the material passes through the gap, as a free-flowing material, it will come to rest on the surface (S). In any case, material flow from the hopper is, for all practical purposes, arrested until the apparatus is vibrated by the gyrator.

The spacing (Y), between the baffle 21 and the dish-shaped member 10, will depend upon the particular material to be handled. Free-flowing materials generally require a lower baffle position than non-free-flowing materials. In fact, some materials having pronounced bridging properties may require no baffle at all, as the inherent bridge effect approaches the function provided by the baffle, that is, supporting the head load of the material above the final discharge outlet 17. However, the baffle is preferred in all cases to insure discharge of the material from the bin on a first-in, first-out basis.

When the gyrator is operating, material bridged across the gap (Y) is subjected to vigorous vibrations, which action tends to unlock the material particles that normally would bridge over this gap. Once the material releases from gap (Y), it proceeds rapidly to the dish-shaped member, or sump, 11, which acts as an accumulator over the final outlet opening 17. Material will accumulate in the sump for a depth of several inches and since this material is in a state of vigorous agitation, it assumes pseudo-fluid characteristics and will, therefore, exit through the outlet opening 17 much like a liquid stream. If the tubular member 12, forming the outlet opening, were to be connected directly to the larger dish-shaped member 10, instead of the sump 11, material would have to enter the tubular member over the edge of intersection of the members 10 and 12, as over a weir, which would greatly retard outflow of the material.

In a bin activator made as herein-described, the vibratory progression of the material toward the final outlet 17 is aided by the downward sloping surface of the dish-shaped member 11. The average slope of the dish-shaped members 10 and 11, taken between the points identified by the letters (M) and (N), preferably should be less than 45 degrees with the horizontal. Such slope results in a positive discharge of the material through the outlet 17 when the gyrator is operating, while, at the same time, preventing discharge of the material when the gyrator is not operating.

The material discharge rate from a bin activator of the described dished-head construction is extremly uniform, being of the order of 5 percent deviation, minute-to-minute, irrespective of the amount of material in the storage bin, or hopper. Thus, the described apparatus not only assures a positive flow of material from the storage bin, but also provides a reasonably uniform material flow rate through the outlet opening 17.

The absence of material flow out of the final outlet opening, when the gyrator is not operating, eliminates the requirement for shut-off gates. Even in the case of relatively free flowing materials, the material which may pass through the annular opening (Y), by gravity flow, merely accumulates on the surface (S) of the lower dish-shaped member.

Storage bins, or hoppers, generally are designed to be filled rapidly and to hold a relatively large quantity of material for subsequent discharge at a desired flow rate continuous or over spaced time periods. These requirements normally lead to a hopper design wherein the bottom portion is tapered, or funnel-shaped, terminating in a relatively small discharge opening. Such construction results in a congestion and packing of the material at the hopper discharge opening. This compacting effect is aggravated in the case of sticky materials (such as wet sand) which have a tendency to bridge across even large horizontal distances and in the case of materials consisting of irregularly-shaped pieces (such as wood chips) wherein the pieces become interlocked physically. These factors, and others, result in the disruption of material flow out of the hopper opening. In apparatus made in accordance with this invention, the hopper discharge opening purposely is made relatively large, that is, considerably larger than required for the desired material flow rate. Substantially all movement of the material out of the main part of the hopper is arrested by the baffle member 21 and the inner surface of dish-shaped member 10. Thus, down to the level of the baffle, only a relatively slight convergence of the material takes place. The principle converging action is reserved for the zone below the baffle where the material has complete freedom of movement. Within this zone, the material moves freely because it is unhindered by the head load of the material within the hopper, because the material in this zone is subject to vigorous agitation, and, also, because the area under the baffle is never completely full. The annular gap (Y), being vigorously vibrated, results in the release of the particles through this gap more or less on an individual basis. This arrangement facilitates not only the flow of the material out of the final outlet opening, but also movement of the material down from the upper regions of the hopper. Having provided for removal of the material in the region of the discharge opening in the bottom of the hopper, there is created a decongested zone immediately above the baffle which then permits the overlying material to follow down readily. In the case of materials having a pronounced tendency to bridge, such as, for example, wet sand, wood chips, and the like, it may be necessary to apply a small amount of vibration to the side walls of the hopper, as by means of small vibrators, or gyrators 65, 66 shown in FIGURE 3. These auxiliary vibrators need apply only a very small amount of vibration to the hopper wall in order to effect a collapse of the bridging material because of the void created in the lower zone of the hopper as the material moves through the annular opening (Y) during vibration of the bin activator apparatus.

Having now described the invention and principles of operation, those skilled in this art will be able to make various changes and modifications without thereby departing from the scope and spirit of the invention as recited in the following claims.

I claim:

1. Apparatus for promoting the flow of material from a storage hopper having a discharge opening formed in the bottom thereof, said apparatus comprising,
    (a) a material-receiving member having a bottom wall defined by a plurality of concave surfaces terminating in a central outlet opening,
    (b) means vibrationally suspending the material-receiving member from the hopper and in spaced position to the hopper wall, and
    (c) means for vibrating the material-receiving member.

2. Apparatus for promoting the flow of material from a storage hopper having a discharge opening formed in the bottom thereof, said apparatus comprising,
    (a) a material-receiving member having a bottom wall defined by a plurality of concave surfaces terminating in a central outlet opening,
    (b) a baffle member rigidly secured to the material-receiving member and having a peripheral surface spaced from the inner wall of the material-receiving member,
    (c) means vibrationally suspending the material-receiving member from the hopper and in spaced position to the hopper wall, and
    (d) means for vibrating the material-receiving member.

3. The invention as recited in claim 2, wherein the baffle member is of convex form and wherein the said means for vibrating the material-receiving member is a gyrator mechanically-coupled to the material-receiving member, said gyrator comprising an eccentrically-mounted weight rotatable by an electric motor.

4. The invention as recited in claim 3, wherein the eccentrically-mounted weight is rotatable in a plane substantially normal to the axis of the said material-receiving member.

5. The invention as recited in claim 3, wherein at least a portion of said baffle member extends into the hopper discharge opening.

6. Apparatus for promoting the flow of material from a storage hopper having a conical lower portion terminating in a hopper discharge opening, said apparatus comprising,
    (a) a first concave member having a central opening formed therein and a cylindrical base portion,
    (b) a second concave member secured to the first concave member and having a central opening formed therein,
    (c) a baffle member secured to the first concave member and having a peripheral surface spaced from the inner wall of the said concave member,
    (d) means vibrationally suspending the first concave member from the hopper, with the said cylindrical base portion spaced from the hopper wall, and
    (e) means for vibrating the said three members as a unit.

7. The invention as recited in claim 6, wherein the said baffle member is an inverted dish-shaped member having a diameter substantially equal to the central opening in said first concave member.

8. The invention as recited in claim 6, wherein the said means for vibrating said three members is a gyrator mechanically-coupled to the said first member, said gyrator comprising an eccentrically-mounted weight rotatable upon energization of an electric motor.

9. The invention as recited in claim 8, wherein said weight is rotatable in a plane substantially normal to the axis of said first concave member.

10. The invention as recited in claim 6, including a flexible band closing the space between the walls of the hopper and the said cylindrical portion of said first concave member.

11. The invention as recited in claim 6, wherein a straight line drawn from a point on the maximum diameter of the said first member to the wall defining the central opening in said second member has a slope of less than 45 degrees with the horizontal.

12. Bin activator apparatus for use with a storage hopper having a tapered bottom wall terminating in a discharge opening of predetermined size, said apparatus comprising,
(a) a first concave member having a central opening formed therein and a cylindrical section having an inside diameter greater than the hopper discharge opening,
(b) a second concave member having a central opening formed therein and a cylindrical portion secured to and extending from said first member,
(c) a third concave member having a diameter less than that of the hopper discharge opening,
(d) spaced supporting members disposed in and secured to the said first member,
(e) means rigidly securing the said third member to the supporting members, with said third member being reversely disposed to and concentric with said first member, and
(f) a gyrator mechanically coupled to the said first member, said gyrator comprising an eccentric weight rotatable by an electric motor thereby to impart vigorous vibrations to the apparatus.

13. The invention as recited in claim 12, wherein a straight line drawn from a point on the maximum diameter of said first member to a point on the wall defining the central opening in said second member has a slope of less than 45 degrees with the horizontal.

14. The invention as recited in claim 12, wherein the said third concave member has a base diameter substantially equal to that of the central hole formed in said second concave member.

15. The invention as recited in claim 12, including a tubular member secured to and extending from said second concave member, said tubular member being concentric with the central opening formed in said second concave member.

16. The invention as recited in claim 12, including means for suspending the apparatus from a storage hopper.

17. The invention as recited in claim 14, wherein the means for suspending the apparatus from a hopper comprises a pair of oppositely-directed mounting plates secured to the outer wall of said first concave member, each plate being provided with spaced holes.

References Cited by the Examiner
UNITED STATES PATENTS

| | | | |
|---|---|---|---|
| 3,178,068 | 4/1965 | Dumbaugh | 222—161 |
| 3,216,626 | 11/1965 | Gaucet | 222—199 |

ROBERT B. REEVES, *Primary Examiner.*

HADD S. LANE, *Examiner.*